United States Patent
Gresch

(10) Patent No.: US 10,431,016 B2
(45) Date of Patent: Oct. 1, 2019

(54) METHOD AND DEVICE FOR IDENTIFICATION OF AN IMPLEMENT

(71) Applicant: Deere & Company, Moline, IL (US)

(72) Inventor: Valentin Gresch, Ensheim (DE)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 15/868,835

(22) Filed: Jan. 11, 2018

(65) Prior Publication Data

US 2018/0211450 A1 Jul. 26, 2018

(51) Int. Cl.
| | | |
|---|---|---|
| G07C 5/00 | (2006.01) | |
| G07C 5/08 | (2006.01) | |
| G07C 5/02 | (2006.01) | |
| A01B 59/043 | (2006.01) | |

(52) U.S. Cl.
CPC .............. G07C 5/008 (2013.01); G07C 5/02 (2013.01); G07C 5/085 (2013.01); A01B 59/043 (2013.01)

(58) Field of Classification Search
CPC ............. G07C 5/008; G07C 5/02; G07C 5/00
See application file for complete search history.

(56) References Cited

U.S. PATENT DOCUMENTS

| | | | | |
|---|---|---|---|---|
| 6,144,295 A * | 11/2000 | Adams | .................. | B60C 23/003 137/224 |
| 6,804,597 B1 * | 10/2004 | Posselius | ............. | A01B 79/005 701/468 |
| 2004/0024510 A1 * | 2/2004 | Finley | .................. | G05B 19/042 701/50 |
| 2008/0110647 A1 * | 5/2008 | Guo | ...................... | A01B 59/069 172/1 |
| 2008/0275609 A1 * | 11/2008 | Boydell | ............... | A01B 69/008 701/42 |
| 2012/0089304 A1 * | 4/2012 | Hamilton | ............. | A01B 79/005 701/50 |
| 2017/0344922 A1 * | 11/2017 | Sauder | ............. | G06Q 10/06311 |

FOREIGN PATENT DOCUMENTS

| | | |
|---|---|---|
| DE | 4328145 A1 | 2/1995 |
| DE | 102007024644 A1 | 11/2008 |
| DE | 102012017451 A1 | 3/2014 |
| DE | 102013010772 A1 | 12/2014 |
| DE | 10 2014 202 181 A1 | 8/2015 |
| EP | 1378863 B1 | 10/2008 |
| EP | 2702846 A2 | 3/2014 |
| EP | 2517543 B1 | 6/2014 |

(Continued)

OTHER PUBLICATIONS

German Search Report issued in counterpart application No. 102017201040.1 dated Mar. 21, 2018. (12 pages).

(Continued)

*Primary Examiner* — Hongmin Fan

(57) ABSTRACT

A method is provided for recording or documentation of an operation of one or more implements configured to be hitched to a utility vehicle. The method includes generating an identification information item associated with each implement, and providing the identification information item with an identification coding. The identification coding is different for each of the one or more implements.

20 Claims, 2 Drawing Sheets

(56) References Cited

FOREIGN PATENT DOCUMENTS

EP 2889166 A1 7/2015
EP 3075909 A1 10/2016

OTHER PUBLICATIONS

Aldo Calcante et al and Fabrizio Mazzetto, Design, development and evaluation of a wireless system for the automatic identification of implements, retrieved from a journal: Computers and Electronics in Agriculture, dated Feb. 1, 2014, pp. 118-127, issue No. 101, Amsterdam NL.
Stone Marvin L et al, ISO 11783: An electronics communications protocol for agricultural equipment, ASAE Distinguished Lecture #23, retrieved from internet on Jun. 16, 2018 <http://asae.frymulti.com/data/pdf/6/ddp2002/lecture23.pdf>, dated Feb. 7, 1999, pp. 3-17, Agricultural Equipment Technology Conference, Louisville, KY.
Nikkila R et al, Software architecture for farm management information systems in precision agriculture, retrieved from a journal: Computers and Electronics in Agriculture, dated Mar. 1, 2010, pp. 328-336, Amsterdam NL.
European Search Report issued in counterpart application No. 18151991.9 dated Jun. 18, 2018. (10 pages).

\* cited by examiner

METHOD AND DEVICE FOR IDENTIFICATION OF AN IMPLEMENT

RELATED APPLICATIONS

This application claims priority to German Application Ser. No. 102017201040.1, filed Jan. 23, 2017, the disclosure of which is hereby expressly incorporated by reference in its entirety.

FIELD OF THE DISCLOSURE

The present disclosure relates to a method and a device for recording or documentation of the operation of an implement that can be hitched to a utility vehicle. Moreover, the present disclosure relates to a system for documentation of the operation of an implement that can be hitched to a utility vehicle.

BACKGROUND

Utility vehicles, e.g., an agricultural utility vehicle, are often hitched to so-called implements (for example, accessory equipment or ballast weight) in order to carry out specific operations such as field operations. An identification or documentation of the operation of the utility vehicle and the implement can be desirable in this case.

A method and a device for the analysis or documentation of the operation of an agricultural utility vehicle is known from DE 10 2014 202 181 A1. In this case an assessment can be made about the operating status (for example, road transport or field operation) of the combination of the utility vehicle and the implement that may be hitched to it.

There is need, however, of identifying different operating statuses of an implement at low technical and economic expense that cannot be achieved by conventional methods or systems known in the art.

SUMMARY

In one embodiment of the present disclosure, a method serves to record or document the operation of an implement that can be hitched to a utility vehicle. A characteristic identification information item is generated for each implement. The identification information item can contain a plurality of individual information items, which refer to the relevant implement. The identification information item can be considered as a data set, with which an individual implement is associated. The identification information item contains at least one identification coding (for example, an ID number), which is different for every implement hitched to the utility vehicle. Thus, each implement is unambiguously identifiable.

The identification coding and other specific data associated with the relevant implement together form the identification information item. In this way an overview and documentation of all implements as well as their operation, in particular their current position or current operating status, can be made available at low technical and economic expense even in the case of larger agricultural operations and a correspondingly large number of utility vehicles and implements.

In particular, the identification coding can be associated with an implement as soon as it is hitched to a utility vehicle for the first time, i.e., after the start of the method or after the start of a suitable device for recording or documentation.

The utility vehicle may be an agricultural vehicle, in particular, a tractor. The implement hitched to the utility vehicle is designed as accessory equipment (for example, attachment for soil working, seeder, bailer, mower, front loader, transport trailer) or as a ballast weight (for ballast for the utility vehicle). The implement is hitched to the utility vehicle via a hitch (in particular, a three-point hitch), which is disposed on a support structure of the utility vehicle.

As already mentioned, the identification information item contains additional data, which are associated with the relevant implement. The additional data support a suitable description of the implements that are present and thus facilitate a clear documentation of the implements.

In one embodiment, the identification information item contains, as additional data, a mass or weight of the implement. In this case, the mass or weight is measured without technical measuring expense, since the data are measured on the utility vehicle anyway by means of an arrangement that acts as a three-point hitch scale (for example, a three-point hitch and associated sensors) and is, for example, standardly available on an electronic bus of the utility vehicle.

In another embodiment, the identification information item contains, as additional data, an identifier (for example, identification number) of an RFID unit (for example, passive RFID transponder) which is disposed on the implement. The RFID unit corresponds with an RFID reader, which is disposed on the utility vehicle. One or more RFID readers are disposed in the region of the front or rear three-point hitches of the utility vehicle. The data of the RFID readers can then be made available on an electronic bus of the utility vehicle.

In addition, the identification number contains, as additional data or as characteristic parameters of the implement, its center-of-gravity coordinates relative to a suitable reference point on the utility vehicle.

Moreover, the identification number contains at least one operating parameter that characterizes or represents the relevant implement. The at least one operating parameter contains, in particular, a current operating status or a current position of the relevant implement.

For example, the implement can have the operating status "raised" or "parked." This is dependent on whether the implement is hitched to the utility vehicle (status "raised") or not (status "parked"). This distinction can advantageously be detected or registered without additional technical expense by means of a three-point hitch scale that is present on the utility vehicle anyway, by evaluating various data from sensors of the three-point hitch scale.

The operating status "raised" of the implement is defined still more specifically, in that a status variant is associated with the operating status. The status variant is determined as a status classification of the utility vehicle, so that no additional technical means are necessary on the implement in order to analyze or recognize the operating status of the utility vehicle. In particular, at least the following statuses are envisioned for the status classification: "stopped," "in road transport," and "in field operation."

Thus, without additional technical expense on the implement itself, at least the following different operating statuses can be identified and correspondingly documented for the implement: "Parked," "raised - stopped," "raised - in road transport," "raised - in field operation."

An "attachment position" of the implement hitched to the utility vehicle is envisioned as a suitable operating parameter. The attachment position again can easily be measured without additional technical expense by means of a three-point hitch scale that is present on the utility vehicle anyway, by evaluating various data from sensors of the three-point hitch scale. In this way it can be technically easily identified and documented if the implement is, for example, mounted on the front side or the rear side of the utility vehicle without needing to expensively equip the implement itself with additional technical means for this.

Further, position information with respect to the implement is appropriate as operating parameter, where the data of said position again are measured without technical devices on the implement itself by deriving it from a current position of the utility vehicle. In particular, the position of the implement is defined on the basis of the current position coordinates of the utility vehicle, where said position coordinates are made available as data by means of a sensor unit of the utility vehicle for sensing signals of a position determining system (for example, GPS, Glonass, Galileo).

The operating parameter "position" can also be utilized so that the current position of the operating vehicle is recorded when the implement is unhitched from the utility vehicle and is parked at a parking position. Through this the identification information item of the implement also implies its current parking position or its current parking place. This supports an unambiguous documentation and oversight of all of the implements of an operation or vehicle fleet. With the recorded current parking position of a plurality of implements, it is also possible for a user, in particular a driver of the utility vehicle, to be guided directly to an available implement that also matches the job assignment to be carried out by means of a navigation system.

A vehicle information item, the data of which represent one or more utility vehicles, is envisioned as operating parameter characterizing the implement. In this way the vehicle information item can provide information about the utility vehicle to which the implement is currently hitched or about the utility vehicles to which the implement was hitched in the past. To generate the vehicle information item one can again do without any technical expense on the implement. Rather one can fall back on data that are available in the electronic equipment of the utility vehicle (for example, the electronic bus). As soon as the implement is hitched to a utility vehicle, the operating parameter "vehicle information item" can receive vehicle-specific data of the current utility vehicle.

In particular, the currently hitched utility vehicle in each case is registered with said operating parameter so that in the course of the operation of the implement a history of the utility vehicles used in combination with said implement can also be recorded and documented.

In another embodiment a useful life in terms of time is envisioned as operating parameter of the implement. Through this, a useful life of the implement in various operating statuses can be identified or documented.

Overall, by means of the identification information item explained above, operating statuses and position data with respect to an implement can be analyzed, documented, and queried, without specific technical equipment (for example, control device, telematics unit) on the implement itself being required. Rather one refers chiefly or entirely to data that are generated on the utility vehicle or are standardly available there (for example on a telematics unit or on an electronic bus of the utility vehicle). Through this the technical and economic expense for recording or documentation of the operation of any implement remains low. Thus, it is also possible in a technically simple way to analyze or document, without electrical control devices or telematics units, the operation of those implements that are operated, for example soil working devices or ballast weights.

Problems in the art may also be solved by a device for recording or documentation of the operation of an implement that can be hitched to a utility vehicle.

The device is programmed to generate an identification information item associated with the implement that is hitched in each case. The identification information item contains an identification coding, which is different for each implement hitched to the utility vehicle. Through this it is also possible in the case of a larger agricultural operation or a larger vehicle fleet to be able to distinguish unambiguously each individual implement from the others.

The device can be any electronic apparatus. For example, it can be designed as an on-board computer of the utility vehicle or as a separate computer (for example, laptop, tablet, smartphone).

The device is designed as a component of a telematics unit of the utility vehicle or as a telematics unit of the utility vehicle. Through this, standard electronic components of the utility vehicle can be used to achieve the desired recording or documentation of the operation of various implements. The telematics unit of the utility vehicle utilizes a satellite-based positioning system, the vehicle's own control devices, and mobile telephony for recording and documentation of positions and operating statuses of the utility vehicle. In this way an uneconomical equipping of the implements themselves with additional technologies such as specific electronics, control devices, etc., can be dispensed with.

The problem posed at the start is additionally solved by a system for documentation of the operation of an implement that can be hitched to a utility vehicle by means of an identification information item generated for each implement. A sending unit of the system transmits the generated identification information item to a data center that is external with reference to the utility vehicle (for example, a server station). The system allows workers of an agricultural operation, for example, to be able to access the documented identification information item and to display the current position of one or more implements via a suitable end device (for example, smartphone, laptop, tablet). In this way, operations managers and drivers of the utility vehicles have oversight over all implements. By means of the documented identification information items, it is also possible to check technical features of the combination of utility vehicle and implement without an extra expense. For example, whether a tractor is optimally ballasted for its relevant agricultural job assignment can be checked.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

DETAILED DESCRIPTION

Figure 1:
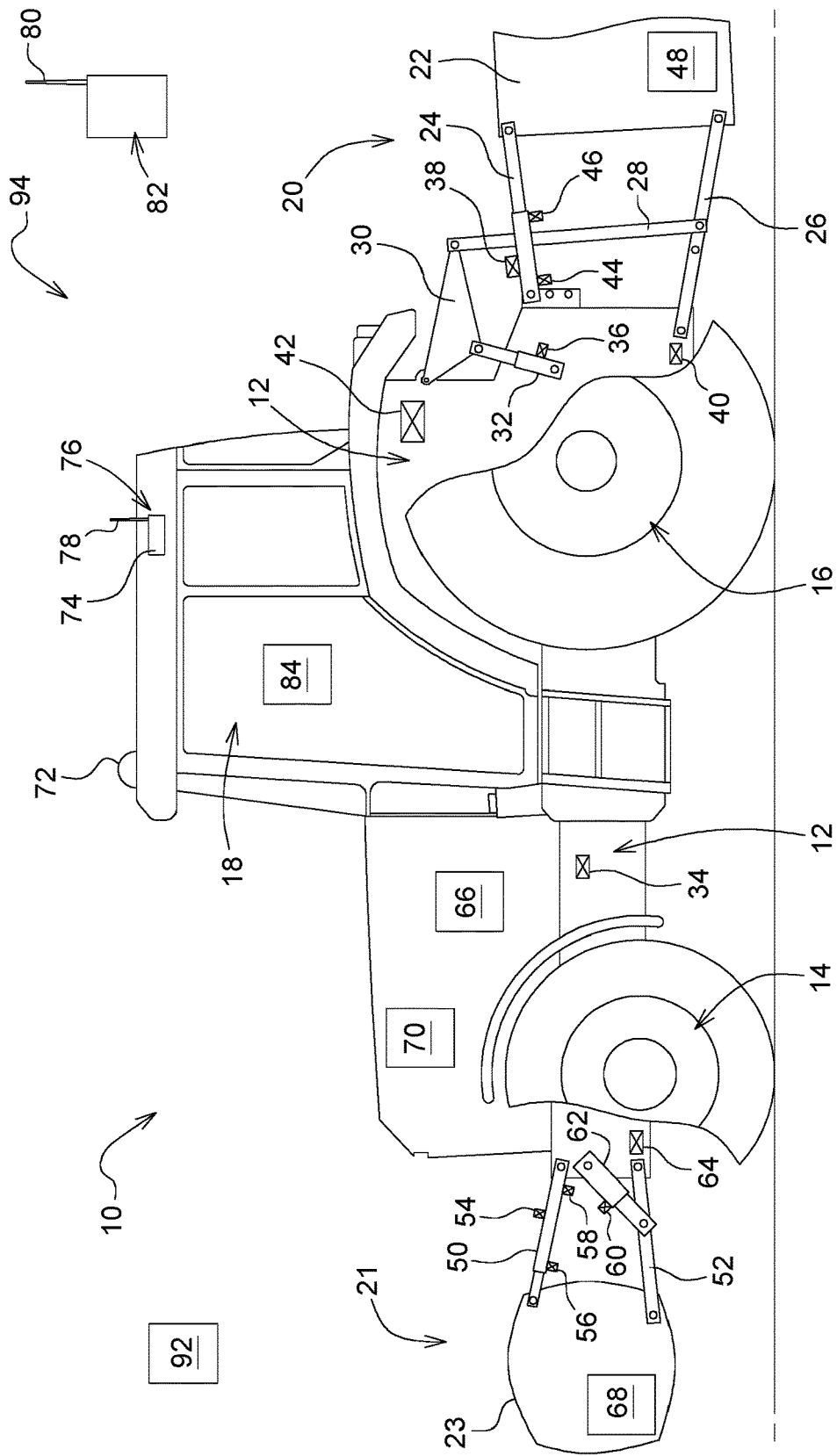
FIG. 1 shows a side view of a utility vehicle made as an agricultural tractor.

In FIG. 1, a utility vehicle 10 is shown in the form of an agricultural tractor. It has a support structure 12, front wheels 14, and rear wheels 16. An operator station is situated in a cab 18.

A three-point hitch 20 is mounted at the rear of the utility vehicle 10. The three-point hitch 20 serves to raise or tow any desired implement 22, which is represented schematically and only in part. The three-point hitch 20 includes a hydraulic top link 24, which is mounted on a hinge in the rear region of the support structure 12. In addition, the three-point hitch 20 comprises two lower arms 26, which are arranged side by side and which are likewise mounted by hinges at the rear region of the support structure 12. Each lower lift arm 26 is connected via a lift element 28 (for example, lift spindle) to one end of a lift arm 30, which is connected by hinge to the support structure 12 of the utility vehicle 10. The lift arm 30 can be pivoted with respect to the support structure 12 via a hydraulic lift cylinder 32 that is supported against the support structure 12.

FIG. 1 shows a plurality of sensors on the utility vehicle 10, which serve to make measurements or to record various physical quantities, in particular at individual components of the rear three-point hitch 20 and a front three-point hitch 21 (which are shown schematically and not true to scale). From the sensor data, among other things, a gravitational force or mass m of the rear implement 22 or a front implement 23 can be determined. A three-point hitch or associated sensors are effective as a three-point hitch scale.

Sensors 34 are designed as an inertial or acceleration sensor disposed permanently on the vehicle (alternatively, tilt or rate or rotation sensor). The hydraulic pressure at lift cylinders 32 is measured by means of a pressure sensor 36. A top link angle between the top link 24 and a vehicle horizontal running in the lengthwise direction of the utility vehicle 10 is determined by means of an inertial or tilt sensor 38. A force sensor 40 measures a tensile force at the lower lift arm 26. A sensor 42 measures the lift height and thus a position of the rear three-point hitch 20. Pressure sensors 44, 46 measure the hydraulic pressure of the top link 24. A control device 48, which can provide information via the so-called mast height of the rear three-point hitch 20, is optionally disposed on implement 22.

The front three-point hitch 21 in turn has a hydraulic top link 50 and two lower lift arms 52, which are arranged side by side. They are on the one hand each hinged to the support structure 12 and on the other hand connected to the implement 23. The implement 23 in FIG. 1 is shown as a ballast weight, but can also have any other form.

A top link angle between the top link 50 and a vehicle horizontal running in the lengthwise direction of the utility vehicle 10 is measured by means of an inertial sensor 54. The hydraulic pressure of the top link 50 is measured by means of pressure sensors 56, 58. A pressure sensor 60 measures the hydraulic pressure of a hydraulic lift cylinder 62 that is supported against the support structure 12 and is at the same time connected to a lower lift arm 50. A sensor 64 measures a position, in particular a lift height, of the rear three-point hitch 20.

In each case according to the embodiment, individual ones of the sensors can be omitted or can be replaced by other sensors, so that different arrangements with a different combination of sensors can result in order to record information items with respect to the three-point hitches 20, 21 or the implements 22, 23.

In addition, a control device 66, which can, among other things, process the sensor data of the front three-point hitch 21 or the rear three-point hitch 22 and can be connected to an electronic bus (for example, CAN bus) of the utility vehicle 10, is disposed on the utility vehicle 10. In addition, an RFID unit 68 (for example, transponder) with an RFID identification number KN can be disposed on an implement (i.e., in FIG. 1 the ballast weight 23). An RFID reader 70 disposed on utility vehicle 10 records the data or the RFID identification number KN of the RFID unit 68. In another embodiment, the rear implement 20 can also have an RFID unit, which corresponds with a corresponding RFID reader.

The utility vehicle 10 additionally provides a receiving antenna 72 to receive the signals from satellites of a position determining system (for example, GPS, Galileo, Glonass) and a control device 74 as a component of a telematics unit 76 of the utility vehicle 10. The telematics unit 76 is connected to a mobile radio antenna 78, which communicates with a mobile radio antenna 80 of an external data center 82 related to the utility vehicle 10 (for example, server station or the like at the agricultural operation or at the vehicle manufacturer) for purposes of data transfer.

In the usual way, the cab 18 also has an operations and display unit 84 for the operator or driver of the utility vehicle 10. As operator interface the operations and display unit 84 is actively and appropriately connected, for example, to an electronic bus (for example CAN) of the utility vehicle 10.

Figure 2:
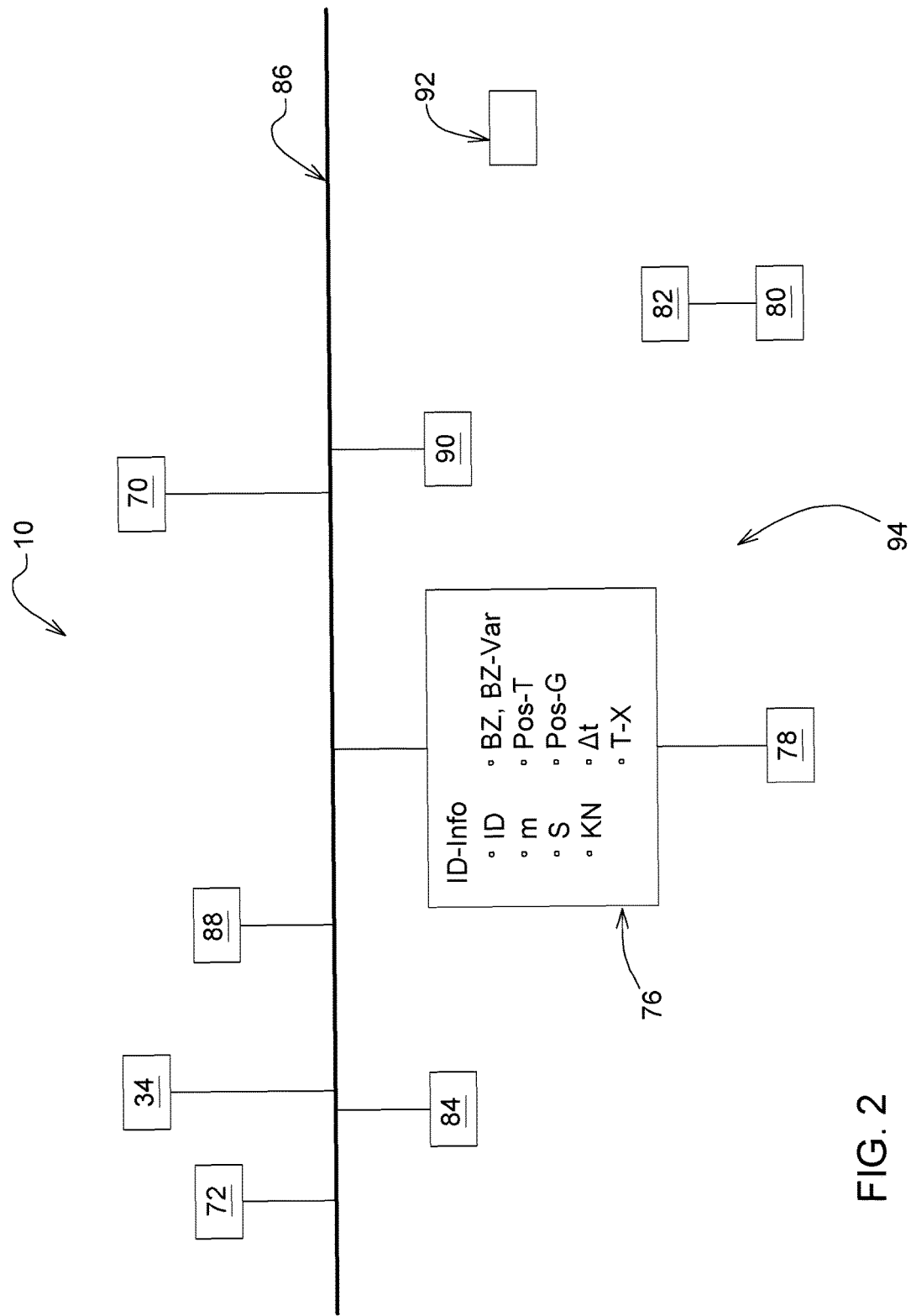
FIG. 2 shows a schematic representation of components for recording and documentation of the operation of an implement.

FIG. 2 shows individual components of the utility vehicle 10 that may be used for a recording and documentation of the operation of the implement 22 or the ballast weight 23. The individual components have already been designated and explained essentially in FIG. 1. They are connected to an electronic vehicle bus 86 (for example CAN bus).

The telematics unit 76 is active as a device for recording or documentation of the operation of an implement, i.e., the implement 22 hitched to the utility vehicle 10 or the ballast weight 23 hitched to the utility vehicle 10. Here, the telematics unit 76 is programmed so that the relevant implement 22, 23 is assigned an identification coding ID as a component of an identification information item ID-Info when it is first hitched to the utility vehicle 10. The identification information item ID-Info for each implement contains a plurality of characteristic data in order to differentiate the individual implements, for example, on an agricultural operation or a vehicle fleet, and to document them clearly.

The identification information item ID-Info contains the mass m of the implement 22, 23 as additional characteristic parameters. The mass m can be determined in a known way via the data of the relevant three-point hitch 20, 21 and the associated sensors and made available in a corresponding control device 88 (for the three-point hitch scale of the rear three-point hitch 20) or control device 90 (for the three-point hitch scale of the front three-point hitch 21). The telematics unit 76 can then access the data concerning the mass m.

As additional characteristic parameters, the telematics unit 76 records a center of gravity S of the relevant implement 22, 23 relative to a defined reference point on the support structure 12. The data can likewise be determined in a known way and made available in the control devices 88, 90. In addition, the telematics unit 76 can access the RFID identification number KN of the RFID unit 68 via the RFID reader 70 and append said data of the identification information item ID-Info to the relevant implement.

In addition, the identification information item ID-Info contains a plurality of operating parameters of the implement 22, 23 that is to be recorded. The following are envisioned as operating parameters in the embodiment example:

an operating status BZ to distinguish if the implement is hitched to the three-point hitch and raised or is unhitched from the three-point hitch and parked, a status variation BZ-Var in the operating status BZ="raised" to distinguish if the implement is stopped, in road transport, or in field operation, a position Pos-G, an attachment position Pos-T to differentiate whether the implement is hitched to the rear or the front of the utility vehicle 10, a useful life Δt of the implement in various operating statuses, and a vehicle information item T-X for recording the utility vehicle 10 with which the implement is currently hitched or was hitched in the past.

The operating status BZ can be recorded via the data of the control devices 88, 90, since the status data of the three-point hitches 20, 21 are provided there. The status variation BZ-Var is recorded in the telematics unit 76 via a status classification of the utility vehicle 10. The position Pos-G is recorded as a current position of the utility vehicle 10 by means of the receiving antenna 72. The attachment position Pos-T can again be recorded via the data of the control devices 88, 90. The useful life Δt is derived from a time period of the three-point hitches 20, 21 and the utility vehicle 10 in certain operating statuses that is made available at the vehicle bus 86 or in the telematics unit 76. The vehicle information item T-X can be generated or actualized by the telematics unit 76 or by the external data center 82.

The identification information item ID-Info generated in the telematics unit 76 of a utility vehicle 10 can, as a data set representing the hitched implement 22 or 23, be sent via the mobile radio antenna 78 to the external data center 82 and stored there for documentation. Individual data of the identification information item ID-Info can be actualized in dependence on changed statuses of the implement 22, 23 in the telematics unit 76 and again sent from there to the external data center 82.

If an implement 22, 23 hitched to utility vehicle 10 is unhitched and parked at a parking position, the parking position then corresponds to a current position Pos-G of the utility vehicle 10. The position Pos-G is recorded in the telematics unit 76 as the current parking place of the implement 22, 23 and is sent to the data center 82 for documentation. An authorized user (for example, operations manager of an agricultural operation or driver of another utility vehicle) can access the documentation in the data center 82 via a suitable end device 92 (for example, smartphone, laptop, tablet) and can display the location Pos-G of said implement. A system 94 which makes available clear documentation and oversight over all existing implements for all authorized users is formed through this. For example, one can check via the said operating parameters of the implements 22, 23 to see if the utility vehicles 10 are hitched to the appropriate implements for their relevant job assignment, in particular are appropriately ballasted with a ballast weight 23.

Thus, with the aforementioned method, the telematics unit 76, and the system 94, it is possible in a cost-effective way at low technical expense to record, communicate, and document positions and operating statuses of implements that are not themselves equipped with electronic components for recording their positions and operating statuses.

While embodiments incorporating the principles of the present disclosure have been described hereinabove, the present disclosure is not limited to the described embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A method for documenting an operation of one or more implements configured to be hitched to a utility vehicle, comprising:

generating a dataset associated with each different implement, wherein the dataset includes at least one operating parameter representing the operating status of the implement, the operating status comprising a hitched status of the implement to the utility vehicle or an unhitched status of the implement from the utility vehicle, and wherein the hitched status is associated with a status variation measured as a status classification of the utility vehicle, the status classification comprising stopped, in road transport, or in field operation; and providing the dataset with an identification coding, the identification coding being different for each of the different implements.

2. The method of claim 1, further comprising associating the identification coding with the implement upon a first hitching of the implement to the utility vehicle.

3. The method of claim 1, wherein the mass is determined based on an arrangement of the utility vehicle that acts as a three-point hitch scale.

4. The method of claim 1, wherein the dataset includes an identifier of an RFID unit disposed on the implement.

5. The method of claim 1, further comprising:
identifying different implements based on different masses thereof.

6. The method of claim 1, wherein the dataset further comprises the mass of the implement, the center-of-gravity of the implement, a location of the implement, and the useful life of the implement.

7. The method of claim 6, wherein the dataset further comprises whether the implement is attached to a front or rear hitch of the utility vehicle, and vehicle information of the utility vehicle.

8. The method of claim 1, wherein the at least one operating parameter comprises an attachment position of the implement hitched to the utility vehicle, wherein the attachment position is measured by means of an arrangement of the utility vehicle acting as a three-point hitch scale.

9. The method of claim 1, wherein the at least one operating parameter comprises a position of the implement, wherein the position is derived from a current position of the utility vehicle.

10. The method of claim 1, wherein the at least one operating parameter comprises a vehicle information item which is representative of the utility vehicle to which the implement is currently hitched, or of at least one utility vehicle to which the implement was hitched to in the past.

11. A device for documenting the operation of one or more implements hitched to a utility vehicle, comprising:

programming to generate a dataset associated with each different implement, wherein the dataset includes at least one operating parameter representing the operating status of the implement, the operating status comprising a hitched status of the implement to the utility vehicle or an unhitched status of the implement from the utility vehicle, and wherein the hitched status is associated with a status variation measured as a status classification of the utility vehicle, the status classification comprising stopped, in road transport, or in field operation; and the dataset including an identification coding which is different for each of the one or more implements hitched to the utility vehicle.

12. The device of claim 11, wherein the device comprises a component of a telematics unit of the utility vehicle or is made as a telematics unit of the utility vehicle.

13. The device of claim 11, further comprising:
programming to identify different implements based on different weights thereof.

14. The device of claim 11, wherein the dataset further comprises the mass of the implement, the center-of-gravity of the implement, a location of the implement, and the useful life of the implement.

15. The device of claim 14, wherein the dataset further comprises whether the implement is attached to a front or rear hitch of the utility vehicle, and vehicle information of the utility vehicle.

16. A system for documenting operations of one or more implements being hitched to a utility vehicle, comprising:
a device programmed to generate a dataset associated with each implement, wherein the dataset includes at least one operating parameter representing the operating status of the implement, the operating status comprising a hitched status of the implement to the utility vehicle or an unhitched status of the implement from the utility vehicle, and wherein the hitched status is associated with a status variation measured as a status classification of the utility vehicle, the status classification comprising stopped, in road transport, or in field operation, and
a sending unit for transmitting the dataset to a data center externally disposed relative to the utility vehicle, the dataset including an identification coding, which is different for each of the different implements.

17. The device of claim 16, wherein the device comprises a component of a telematics unit of the utility vehicle or is made as a telematics unit of the utility vehicle.

18. The device of claim 16, wherein the device is further programmed to identify different implements based on different centers-of-gravities thereof.

19. The device of claim 16, wherein the dataset further comprises the mass of the implement, the center-of-gravity of the implement, a location of the implement, and the useful life of the implement.

20. The device of claim 19, wherein the dataset further comprises whether the implement is attached to a front or rear hitch of the utility vehicle, and vehicle information of the utility vehicle.

* * * * *